Patented Oct. 22, 1946

2,409,906

UNITED STATES PATENT OFFICE 2,409,906

SYNTHETIC RESIN

Milton J. Scott, Springfield, Mass., assignor to Monsanto Chemical Company, St. Louis, Mo., a corporation of Delaware No Drawing. Application March 16, 1943, Serial No. 479,360

27 Claims. (Cl. 260—42)

This invention relates to new aminotriazine-aldehyde condensation products and a method of making the same. More particularly, this invention relates to melamine-formaldehyde resins modified by mono-amino-diphenyl compounds such as mono-ortho-amino-diphenyl.

In making melamine-formaldehyde condensation products, an initial addition product of the melamine and the formaldehyde may be formed by reacting melamine with formaldehyde in aqueous solution. The resulting product may then be subjected to distillation to remove the water present. Due to the high melting point of the initial reaction product and the tendency of said product to polymerize, serious difficulties are encountered in attempting to thoroughly remove the water by distillation without causing excessive polymerization. Also, molded products made from such melamine-formaldehyde condensation products or other amino-triazine-aldehyde products have a high rate of shrinkage on aging, are somewhat brittle and tend to develop cracks, particularly around metal inserts.

According to the present invention it has been found that improved aminotriazine-aldehyde condensation products and particularly melamine-aldehyde condensation products, may be obtained by incorporating therein a mono-amino-diphenyl, preferably mono-ortho-amino-diphenyl, mono-para-amino-diphenyl or a mixture of such compounds. These mono-amino-diphenyls may be substituted in the ring with halogen, alkyl or other groups which are not reactive with aldehydes under the conditions of reaction. Examples of such products are mono-chlor ortho-amino-diphenyl, dichlor ortho-amino-diphenyl, trichlor para-amino-diphenyl, tetrachlor ortho-amino-diphenyl, mono-, di-, or tri-methyl, ethyl, propyl, butyl amino-diphenyls and the like. More particularly, it has been found that it is especially advantageous to initially react melamine and formaldehyde and then react the resulting methylol derivatives of melamine with mono-ortho-amino-diphenyl. Thus, it has been found that such a product is lower in melting point and reactivity than the corresponding melamine-formaldehyde condensation product and may be dehydrated more completely and conveniently by distillation without causing substantial advancement of the resin. The resulting dehydrated product may then be further processed, for example, to form molded products with unexpected and advantageous properties.

In preparing the products of the present invention, the relative proportions of melamine, formaldehyde and mono-ortho-amino-diphenyl may be varied over a substantial range. However, it is generally advantageous to work within certain limits. Thus, it is desirable to have a molar ratio of formaldehyde to melamine of at least about 1:1 and, in general, in preparing an initial melamine-formaldehyde addition product it is advantageous to employ a molar ratio of formaldehyde to melamine sufficiently higher than 1:1 so that a clear initial reaction product is obtained, thus indicating that all of the melamine has reacted. For example, a ratio of formaldehyde to melamine of at least 2:1 is generally preferred. In general, the foregoing ratios may be used when employing other amino-triazines and aldehydes, but some of the preferred ratios are set forth hereinafter.

While it is theoretically possible to react 6 mols of formaldehyde with 1 mol of melamine, in carrying out the process of the present invention it is generally advantageous to react initially not over 4 mols of formaldehyde with each mol of melamine, thereby avoiding forming a product too reactive to process conveniently.

The preferred embodiment of the process of this invention is to initially form partial condensation products of melamine and formaldehyde and then react these products with mono-ortho-amino-diphenyl. The partial condensation products are believed to be addition products of formaldehyde and melamine and are commonly referred to as methylol derivatives of melamine. Thus, it is possible to produce mono-, di-, tri-, tetra-, penta-, and hexa-methylol melamine or mixtures thereof. In fact, it is probable that when formaldehyde reacts with melamine to form partial condensation products, mixtures of methylol derivatives result. However, it is generally considered that the initial products consist principally of the methylol derivative most closely corresponding to the molar ratio of formaldehyde employed. One of the preferred ratios of aldehyde used is that which gives principally the di-methylol melamine derivatives. Obviously, fractional methylol derivatives cannot be formed, so that when fractional molar ratios of formaldehyde to melamine are employed the principal methylol derivatives are believed to be correspondingly distributed between the next higher and the next lower methylol derivatives.

According to one of the preferred embodiments of this invention, formaldehyde is reacted with the melamine only until the desired proportion of the formaldehyde present has reacted and not substantially beyond the monomeric state of the methylol melamines. When it is desired to filter the solution of the addition product of formaldehyde with melamine it is advantageous to continue the reaction until a slight amount of ice water-insoluble resin is formed. Crystallization during filtration is thus avoided.

It is further preferred that substantially all of the formaldehyde be reacted with the melamine before the mono-amino-diphenyl compound is added. By carrying out the reaction in this manner it is believed that the mono-amino-diphenyl compound reacts substantially only with methylol groups attached to the melamine. Thus, a preferred manner of carrying out the reaction is to treat melamine under alkaline conditions with formaldehyde in the molar ratio of 2.3 mols of formaldehyde to 1 of melamine until substantially all of the formaldehyde has reacted thereby forming an addition product consisting principally of di-methylol melamine. This product is partially dehydrated and then treated with about 1.5 mols of mono-ortho-amino-diphenyl, for each mol of melamine used.

The lower limit of the mono-amino, diphenyl added according to the preferred embodiment of this invention is the amount needed to give a reaction product with a sufficiently low melting point so that dehydration may be carried out without substantially advancing the polymerization of the product. The amount necessary to produce this unexpected result will vary to some extent with the particular partial condensation of melamine and formaldehyde employed. In general, when from 1 to 4 mols of formaldehyde are reacted with 1 mol of melamine only to the extent of insuring substantially complete addition of the formaldehyde to the melamine, from about 1 to about 3 or 4 mols of mono-amino-diphenyl, or one of the ring substituted mono-amino-diphenyls referred to hereinbefore are sufficient to produce a product that can be readily dehydrated by vacuum distillation.

In general, it is desirable that the thoroughly dehydrated reaction product of the methylol melamine and the mono-amino-diphenyl possesses a softening point, as determined by the copper bar method given below, at least as low as 110–120° C., for example 115° C. or below. Such softening temperatures are exhibited, for example, by the reaction products of 1.5 mols of mono-ortho-amino-diphenyl and the water-soluble addition product of 2.3 mols of formaldehyde with 1 mol of melamine. In contrast to these softening temperatures, a partial condensation product of, for example, 2 mols of formaldehyde and 1 mol of melamine softens at these low temperatures only when a substantial amount of water is allowed to remain in the partial condensation product.

The copper bar softening point determination referred to above is carried out in the following manner.

A copper bar, which in dimension is approximately 2 inches by 2 inches by 19 inches, is heated at one end and cooled at the other end so that a temperature differential exists along the length of the bar. This temperature differential is measured by 19 mercury thermometers which are inserted into the bar at intervals of 1 inch and the temperature differential is such that there is a difference between successive thermometers of 2 to 3° C.

In carrying out the test, the resin in the form of a powder which will pass through a 140-mesh screen is sprinkled onto the bar. After the powdered resin has been in contact with the bar for about 10 seconds, the softening point test is made. This is done by attempting to brush the powdered resin off the bar with a fine camel's hair brush and noting where the resin adheres to the bar. The temperature noted as the softening point is the lowest temperature of the bar at which the powdered resin adheres to the bar.

The upper limit of the mono-amino-diphenyl added to the melamine-formaldehyde addition product, according to the preferred embodiment of this invention is determined in general by the number of methylol groups present and the nature of the product desired. Thus, in general, it is preferred that the mols of mono-amino-diphenyl do not exceed the mols of aldehyde used.

Furthermore, while the preferred procedure given hereinbefore calls for conditions that tend to result in all the mono-amino-diphenyl being attached to the methylol products, the present invention contemplates resinous melamine-formaldehyde products containing mono-amino-diphenyl residues present in other states of chemical combination. For example, a methylol melamine may be treated with mono-amino-diphenyl in molar excess of the methylol groups present and the excess of mono-amino-diphenyl reacted with additional formaldehyde so that in the final product the mono-amino-diphenyl may be present in the product as a separate mono-amino-diphenyl-formaldehyde complex.

In the preferred embodiment of this invention the addition product of melamine and formaldehyde is formed at a pH of 6.5 to 10.0 (glass electrode) and particularly at a pH of 7.5 to 9.5. During the dehydration of the above addition product prior to addition of the mono-amino-diphenyl it is preferred to operate at a pH of substantially 9.0 to 10.0 (glass electrode).

During the reaction of the mono-amino-diphenyl with the melamine-formaldehyde addition product it may be advantageous to have present a water-insoluble solvent for the ultimate reaction product such as xylene, toluene and the like, particularly when a low proportion of mono-amino-diphenyl is employed, for example, when a molar ratio of mono-amino diphenyl to melamine of 1:1 or less is employed. For example, such a solvent may be employed to expedite the thorough removal of the water during the subsequent dehydration by subjecting the reaction mixture to distillation and continuously separating and returning to the reaction vessel the distillate layer containing the water-insoluble solvent until the water is entirely removed and thereafter removing the water-insoluble solvent.

Illustrative of the process according to the present invention and the products obtained thereby, but not limitative thereof, are the following specific examples.

*Example I*

A mixture of 1500 grams of melamine (11.9 mols) and 2258 grams of an aqueous 37% solution of formaldehyde (27.9 mols) in a vessel equipped with a reflux condenser is treated with a sufficient amount of an aqueous 5% sodium hydroxide solution (approximately 3 grams required) to increase the pH to 7.8 as shown by a glass electrode. The foregoing mixture is then heated to 90-95° C. whereupon a clear aqueous solution is formed. Heating of this solution at 90° C. is continued until a milky colloidal precipitate is obtained (indicating the presence of a small amount of polymer) when a drop of the solution is passed into ice water. Usually this requires about 15 minutes. Thereupon sufficient aqueous 5% sodium hydroxide solution is added to change the pH to substantially 9.4 (glass electrode) and the product is then cooled to 72°C. The resulting reaction mixture is then partially dehydrated by distillation under a vacuum corresponding to about 21 inches of mercury during which the temperature of the reaction mixture is raised about 5° C. When the temperature reaches about 77° C., 2010 grams (11.9 mols) of melted mono-ortho-aminodiphenyl are added. The resulting mixture is slowly heated to reflux temperature in about 15 minutes and held at reflux about 45 minutes, whereupon a clear reaction product is obtained containing water dispersed therein. This product is then dehydrated by distillation at atmospheric pressure and at a temperature of 100-118° C. and then under a vacuum corresponding to 27-29 inches of mercury at a temperature of 125 to 130° C. until substantially all the water is removed. The resulting resin, after cooling, is a clear, transparent and easily grindable resin.

This resinous product is water-insoluble, but soluble in furfural, furfuryl alcohol and somewhat soluble in coal tar solvents such as xylene and toluene. It is soluble in dilute acids, for example, hydrochloric or sulphuric acids, forming salts therewith.

*Example 2*

The process described in Example 1 is repeated except that the proportion of ortho-amino-diphenyl is increased to 3015 grams (17.8 mols). The product obtained possesses properties similar to those of the product described in Example 1. However, the product of the present example possesses increased solubility in such solvents as xylene and toluene.

*Example 3*

The process described in Example 1 is repeated except that a molar ratio of formaldehyde to melamine of 3.5:1 and a molar ratio of ortho-amino-diphenyl to melamine of 2:1 are employed. The product after reaction with the ortho-aminodiphenyl is readily dehydrated by vacuum distillation and the product possesses properties similar to those of the product of Example 2.

*Example 4*

1500 grams of melamine (11.9 mols) are mixed with 2258 grams of an aqueous 37% solution of formaldehyde (27.8 mols). A sufficient amount of an aqueous 5% solution of sodium hydroxide is added to increase the pH to about 9.3 (glass electrode). The resulting mixture is heated to boiling (about 95° C.) in a vessel equipped with a reflux condenser. This usually requires about 15 minutes. The product is a clear, aqueous solution that does not precipitate when passed into ice water. Immediately upon reaching the boiling point, 3015 grams (17.8 mols) of melted mono-ortho-amino-diphenyl is added to this product and the resulting mixture is boiled under reflux conditions for about 30 minutes. The resulting product is dehydrated by distillation at atmospheric pressure and temperatures up to about 118° C. and thereafter under a vacuum corresponding to 27-29 inches of mercury at temperatures up to about 130° C., whereby substantially all of the water is removed. The resulting resin possesses properties similar to those of the product described in Example 2.

*Example 5*

1500 grams (11.9 mols) of melamine are mixed with 2258 grams (27.8 mols) of an aqueous solution of formaldehyde (37% HCHO). The pH of this mixture is increased to about 7.8 (glass electrode) by the addition of an aqueous sodium hydroxide solution, (5% NaOH). The resulting mixture is heated to boiling in a vessel equipped with a reflux condenser (requires about 15 minutes) whereupon a clear, aqueous solution is formed that does not precipitate when passed into ice water. Heating of this solution at 90-95° C. under reflux conditions is continued for about 15 minutes. The resulting product is a clear, aqueous solution which gives a milky colloidal precipitate when passed into ice water. The pH of this product is then increased to about 9.4 (glass electrode), with a 5% aqueous solution of sodium hydroxide and the mixture immediately cooled to about 72° C. Thereafter the mixture is partially dehydrated by distillation under a vacuum corresponding to about 21 inches of mercury during which there is a temperature rise to about 77° C. (about 30 minutes required). To this partially dehydrated product, 2010 grams (11.9 mols) of melted mono-ortho-aminodiphenyl and 100 grams of xylene are added. The resulting mixture is heated to boiling over a period of about 15 minutes and boiled under reflux conditions for about 45 minutes. The product comprises a clear, resinous mass containing water dispersed therein. This product is then concentrated by distillation at atmospheric pressure and at temperatures up to about 118° C. and then under a vacuum corresponding to about 27-29 inches of mercury at temperatures up to about 130° C. During this distillation the xylene that distills over is continuously returned to the reaction mixture until water is no longer distilled off and thereafter the xylene is allowed to distill off. The resulting resinous reaction product possesses properties similar to those of the product described in Example 1.

The products described in Examples 1, 2, 3, 4 and 5 may be employed for various purposes for which synthetic resins are adaptable. In particular, these products have been found to have special advantages in preparing thermosetting molding compositions. The products described in Examples 1, 2, 3, 4 and 5 are essentially non-thermosetting and require reaction with additional quantities of a reactive methylene-group-containing compound such as formaldehyde, paraformaldehyde, hexamethylenetetramine, or formaldehyde partial condensation products in order to be heat cured to infusible, insoluble products. Examples of the latter class of compounds include methylol aminotriazines, for example, tetra methylol melamine, methylol ureas and methylol amides such as dicyandiamide-formaldehyde partial condensation products. Also, when desirable, partial condensation products of formaldehyde and phenols are employed. While, in general, the reactive methylene-group-containing compositions are obtained by partial reaction of formaldehyde with a suitable material, partial reaction products of other aldehydes may be advantageous. In such cases the thermosetting properties are obtained from a reactive substituted methylene-group-containing composition.

One embodiment of a methylol melamine that may be employed to render thermosetting such resins as those described in Examples 1, 2, 3, 4 and 5 may be prepared by reacting an aqueous mixture containing formaldehyde and melamine in a molar ratio of about 4:1 at a pH of about 7.5 to 8.5 until a slight precipitate is obtained when a drop of the reaction mixture is passed into ice water, and then partially dehydrating the resulting product by distillation first at atmospheric pressure and then under a vacuum corresponding to 20-21 inches of mercury, at temperatures not exceeding about 115° C.

Another example of a suitable reactive methylene-group-containing composition is one prepared by mixing 60 grams (1 mol) of urea with 162 grams (2 mols) of an aqueous formaldehyde solution (37% HCHO), adjusting the pH to about 8.3 with an aqueous sodium hydroxide solution (5% NaOH), heating this mixture to boiling and boiling under reflux conditions for about 15 minutes, then adjusting the pH to about 5.0 and continuing the boiling until a precipitate is obtained on passing a drop of the product into ice water, then adjusting the pH to about 8.3 and then dehydrating the product first at atmospheric pressure and then at a vacuum corresponding to about 20-21 inches of mercury and at temperatures not exceeding about 112° C.

A still further example of a reactive methylene-group-containing composition is one prepared by reacting 84 grams (1 mol) of dicyandiamide with 162 grams (2 mols) of an aqueous formaldehyde solution (37% HCHO) at a pH of about 7.0 by heating the mixture to boiling over a period of about 30 minutes and then immediately subjecting the product to distillation at a vacuum corresponding to about 27-29 inches of mercury. This causes the temperature of the mixture to drop and as the water is boiled off the mixture increases in viscosity. When the viscosity becomes so high as to greatly slow down the effectiveness of the dehydration, the degree of vacuum is lowered and the temperature raised until in the final stages the distillation is carried out at a vacuum corresponding to 20-21 inches of mercury at a temperature of 110-120° C.

The following examples are illustrative of the preparation of thermosetting molding compositions. Parts are by weight.

*Example 6*

65 parts of the product described in Example 1 are mixed with 35 parts of a partial melamine formaldehyde condensation product, 2 parts of "Vinsol" resin (reported to be an extracted pine wood pitch as described in U. S. Patent 2,060,856), 2.5 parts of zinc stearate, 34 parts of cotton flock and 136 parts of silica flour in the well known manner for preparing molding compositions. The partial melamine formaldehyde condensation product employed corresponds to that employed in Example 1 just prior to the addition of the orthoamino-diphenyl except that the dehydration under a vacuum corresponding to 20-21 inches of mercury was carried to a temperature of 114° C.

Molded products are prepared from the foregoing thermo-setting molding composition by subjecting the composition to heat and pressure in a suitable mold. For example, disks ⅛ inch in thickness may be molded by subjecting the molding composition to a pressure of 3000 pounds per square inch and a temperature of 150° C. for 7 minutes. The resulting products possess the following properties:

After shrinkage _____ 1 mil per inch
Deflection (A. S. T. M. D650-41T) ____ 0.040 inch
Arc resistance (A. S. T. M.
  D495-41) _____ 180 to 187 seconds
(Dielectric strength (A. S. T. M.
  D149-39T) (step-by-step 0.125
  inch thickness at 25° C.) _____ 365 volts per mil
Power factor (A. S. T. M. D150-41T)
  (50,000 cycles, 25° C.) _____ 0.020
Dielectric constant (A. S. T. M. D150-41T)
  (50,000 cycles, 25° C.) _____ 4.7

Consideration of the foregoing properties of the molded products of Example 6 shows the remarkable mechanical and electrical properties of these products. Especially to be noted is the low "after shrinkage." "After shrinkage" results given in the foregoing table are obtained by the method described below and indicate the degree of shrinkage normally encountered after 1 to 2 years of use under ordinary conditions. In carrying out this test a molded disk 4 inches in diameter and 0.125 inch is allowed to cool to about 25° C. immediately after molding and its dimensions are measured. Then the disk is subjected to a temperature of 220° F. for 8 hours in an oven provided with circulation, allowed to cool to about 25° C. and its dimensions measured again. From the difference in size before and after the heating period the degree of shrinkage is calculated.

The low degree of "after shrinkage" given in the table above is to be contrasted with an "after shrinkage" of 4.5 mils per inch obtained with molded products the preparation of which differs only in that unmodified melamine-formaldehyde resin is employed in place of the mono-ortho-amino-diphenyl melamine formaldehyde resin.

Another outstanding characteristic of the molded product described in Example 6 is its resistance to cracking when it contains metal or other non-shrinking inserts. While molded products made from unmodified melamine-formaldehyde resins and containing metal inserts tend to crack in the area surrounding the inserts within a few days after molding, the molded products of example 6 containing metal inserts do not crack after long continued use.

*Example 7*

100 parts of the product described in Example 1 are mixed with 10 parts of paraformaldehyde, 3 parts of "Vinsol" resin, 2.5 parts of zinc stearate and 170 parts of silica flour in a manner well known to those skilled in the art of preparing thermosetting molding compositions.

From the foregoing thermosetting molding composition molded products are prepared in the manner described in Example 6. The molded products obtained possess properties similar to those of the molded products described in Example 6.

The extracted pine wood pitch employed in the molded compositions described in Examples 6 and 7 may be replaced with other acidic materials, particularly organic acidic materials, for example, oxalic acid, phthalic acid, sulfamic acid or shellac. In general, it is desirable to include a sufficient amount of a suitable compatible acidic material to reduce the flow time of the molding composition to about 90 to 120 seconds as determined on the Olsen-Bakelite flow tester. However, it is not necessary that the flow time of the molding compositions be reduced in order to achieve molded products with the advantageous properties of the products described in Examples 6 and 7. Thus, the following is an example of a molded product obtained without the inclusion of an acidic material such as those mentioned above.

*Example 8*

30 parts of the product described in Example 1 are mixed with 70 parts of the partial melamine formaldehyde condensation product employed in Example 6, 2.5 parts of zinc stearate, 34 parts of cotton flock and 136 parts of silica flour in the well known manner for preparing molding compositions. The resulting composition is molded in the usual manner, for example, under a pressure of 3,000 pounds per square inch at a temperature of 150° C. for 8 minutes, in molding disks 0.125 inch in thickness. The molded products possess properties similar to those of the product described in Example 6 and in particular, possess the low "after shrinkage" value set forth in Example 6 and when containing metal inserts do not crack after long continued use.

An especial advantage in employing a reactive methylol group-containing composition as a hardening agent such as the melamine-formaldehyde partial condensation product employed in Example 6 is that a close control is afforded over the rate of heat-curing. Depending on the proportion of melamine-formaldehyde partial condensation product employed either a fast or slow rate of curing may be obtained. The control of the rate of cure greatly exceeds that of conventional hardening agents such as hexamethylenetetramine which, even in large amounts, do not produce a fast rate of cure of products such as that described in Example 1. In general, however, the ratio of unmodified melamine-formaldehyde resin to ortho-amino-diphenyl modified melamine-formaldehyde resin should be from 1:3 to 3:1.

The process of the present invention and the products obtained, particularly those exemplified by Examples 1, 2, 3, 4 and 5, have many advantageous and unexpected properties. Thus, as indicated hereinbefore, the product of the reaction between the ortho-amino-diphenyl and the melamine-formaldehyde addition product can be completely and readily dehydrated by vacuum distillation. The resulting product, particularly when a substantial proportion of ortho-amino-diphenyl has been reacted with the melamine-formaldehyde addition product, possesses solubility in organic solvents in which prior melamine-formaldehyde reaction products are insoluble, for example, xylol, benzol, and especially furfural, furfuryl alcohol and the like. Consequently, such products are suitable for surface coatings with or without admixture with other materials. Other contemplated applications of these products include grinding wheels, the bonding agent of which comprises these new resins with or without prior reaction with such substances as furfural; sizing agents for paper whereby initially-formed soluble acid salts of these products are used to form insoluble metal salts, for example, an aluminum salt, in the paper; treating agents for leather; anti-creasing agents for textiles whereby increased flexibility is obtained; adhesives, for example, for paper, wood, cloth and the like; casting resins; and numerous other uses for which these products are especially adaptable.

The fact that these products may be readily reacted with such aldehydes as furfural is an unexpected and highly advantageous characteristic since the unmodified melamine-formaldehyde condensation products are insoluble in furfural and show little or no reaction therewith.

A most outstanding use of the new resins of this invention as exemplified particularly by Examples 6 and 7 is in forming molded insulation where exceptional electrical and mechanical properties have been obtained as shown above.

Various modifications in the process and products of the present invention may be introduced without departing from the contemplated scope thereof. Thus, the order of reacting the ingredients and the reaction conditions may be varied to meet particular needs. Modifying agents may be introduced before, during or after chemical combination of melamine, formaldehyde and mono-amino-diphenyl. Such modifying agents include condensation catalysts, fillers, plasticizers, solvents, diluents, thermosetting and thermoplastic synthetic resins or their ingredients, natural resins and the like.

Included within the scope of this invention are other aldehyde-reactable aminotriazines than melamine. Examples of other aminotriazines include substituted melamines, for example, chlorinated, alkylated or phenylated melamines, deaminated melamines, for example, ammeline, ammelide and the like. Other examples of aminotrazines are 2, 4, 6-triethyl and triphenyl-triamino-1, 3, 5-triazines, 2, 4, 6, trihydrazino-1, 3, 5-triazine and the corresponding condensed triazines such as melam and melem, 2-amino-1, 3, 5, triazine, 2-chloro-4, 6-diamino-1, 3, 5, triazine, 2-phenyl-4-amino-6-hydroxyl-1,3,5 triazine and 6-methyl-2, 4-diamino-1, 3, 5-triazine. Mixtures of amino-triazines are also included within the scope of this invention. When the particular amino-triazine employed contains less than six aldehyde-replaceable hydrogen atoms, the proportions of mono-amino-diphenyl and formaldehyde given hereinbefore for reaction with melamine may be reduced. In general, in order to achieve thermosetting products it is preferred that the amino-triazine have at least three aldehyde replaceable hydrogen atoms attached to aminido nitrogen atoms.

While formaldehyde, particularly aqueous solutions of formaldehyde (or compounds engendering formaldehyde) is the preferred aldehyde, other aldehydes than formaldehyde are included within the scope of this invention, for example, aliphatic aldehydes such as acetaldehyde, propionaldehyde, butyraldehyde, heptaldehyde, hexaldehyde, furfural; unsaturated aldehydes, such as acrolein or methacrolein; aromatic aldehydes, such as benzaldehyde; and mixtures of aldehydes. Thus, reaction products of mono-amino-diphenyl and amino-triazine- aldehyde addition products broadly are comprehended by the present invention. The aldehyde-amino-triazine addition products may be termed alkylol-aminotriazines. In particular, as indicated by Examples 1, 2, 3, 4, and 5, water-soluble aldehyde-aminotriazine addition products are contemplated.

Furthermore, when thermosetting compositions are prepared from mixtures of mono-amino-diphenyl modified amino-triazine-aldehye resins and partial condensation products prepared from an aldehyde and a thermosetting resin-forming reactant such as melamine, the scope of the aldehyde contemplated is that given above in preparing the mono-amino-diphenyl-aminotriazine-aldehyde-reaction product.

As alkaline condensing agents, strongly alkaline materials are generally preferred. These may be inorganic, for example, sodium or potassium hydroxide or carbonate; or organic, for example, quaternary ammonium bases such as, dimethyl dibenzyl ammonium hydroxide, trimethyl benzyl ammonium hydroxide, tetraethyl ammonium hydroxide, tetra-ethanol ammonium hydroxide. However, weaker bases may be employed when advantageous, for example, ammonia, amines such as ethylene diamine, alkylol amines, such as triethanol amine, basic salts such as trisodium phosphate. Mixtures of two or more alkaline condensing agents may be employed. When advantageous, neutral or acid reaction conditions may be employed instead of alkaline conditions. Such conditions may be obtained by the addition of suitable condensing agents. When acid condensing agents are needed such acidic materials as mineral acids, e. g. hydrochloric or phosphoric acids; or organic acids, e. g. oxalic acid; or acid salts, e. g. monosodium phosphate, or mixtures thereof, may be employed.

The temperatures at which the reactions are carried out may be varied according to the nature and proportion of the ingredients employed and the particular results desired. While dehydration by vacuum distillation is generally preferred other dehydration means may be employed to remove undesired water and/or other volatile materials, for example, spray drying or drum drying may be employed when advantageous.

In preparing molding compositions comprising the resinous products of this invention various types of fillers may be employed, for example, cellulosic fillers such as wood flour, walnut shell flour; heat-resistant fillers such as asbestos and mica, Fiberglas, mineral wool, cloth cuttings and the like. Other materials may also be included, for example, dyes, pigments, plasticizers, mold lubricants and the like.

Thermosetting molding compositions prepared according to this invention may be molded, in general, at pressures of 2500–4000 pounds per square inch and at temperatures of 140–180° C.

What is claimed is:

1. A resinous composition comprising the heat reaction product of 1 to 4 molecular proportions of mono-ortho-amino-diphenyl and an addition product of 1 to 6 molecular proportions of formaldehyde with 1 molecular proportion of melamine.

2. A resinous composition of matter comprising a heat-reaction product of 1 to 3 molecular proportions of mono-ortho-amino-diphenyl and an addition product of 1 to 4 molecular proportions of formaldehyde with 1 molecular proportion of melamine.

3. A process of preparing a resinous composition comprising heating 1 to 4 molecular proportions of mono-ortho-amino-diphenyl and an addition product of 1 to 6 molecular proportions of formaldehyde with 1 molecular proportion of melamine.

4. A composition of matter comprising the reaction product of ingredients comprising an aminotriazine-aldehyde addition product and a primary chlorinated mono-amino-diphenyl free from aldehyde-reactive substituents, in the proportion of at least about 1 molecular proportion of said amino-diphenyl for each molecular proportion of aminotriazine.

5. A resinous composition comprising the reaction product of 1 to 4 molecular proportions of chlorinated mono-ortho-amino-diphenyl with an addition product of 1 to 6 molecular proportions of formaldehyde with 1 molecular proportion of melamine.

6. A thermosetting molding composition comprising a product obtained by heating, under alkaline conditions, mono-ortho-amino-diphenyl and dimethylol melamine in a molar ratio of 1.5:1, a heat-curable resin prepared by reacting, under alkaline conditions, melamine and formaldehyde in a molar ratio of 1:2.3, and a filler.

7. A composition of matter comprising the heat reaction product of ingredients comprising an aminotriazine-aldehyde addition product and a primary mono-amino-diphenyl free from aldehyde-reactive substituents, the molecular proportions of the amino-diphenyl being at least equal to the molecular proportions of the aminotriazine but not exceeding the molecular proportions of aldehyde used to form said addition product.

8. A composition as defined in claim 7 in which the amino-diphenyl is a primary mono-ortho-amino-diphenyl.

9. A composition of matter comprising the heat reaction product of ingredients comprising a methylol-aminotriazine containing 1–6 methylol groups, and 1–4 molecular proportions of a primary mono-amino-diphenyl free from aldehyde-reactive substituents for each molecular proportion of combined aminotriazine.

10. A composition of matter comprising the heat reaction product of 1–3 molecular proportions of a primary mono-amino-diphenyl free from aldehyde-reactive substituents, and a water soluble condensation product of 2–4 molecular proportions of an aldehyde with one molecular proportion of an aminotriazine.

11. A composition of matter comprising the heat reaction product of ingredients comprising a melamine-aldehyde addition product and a primary mono-amino-diphenyl free from aldehyde-reactive substituents, the molecular proportions of the amino-diphenyl being at least equal to the molecular proportions of melamine but not exceeding the molecular proportions of aldehyde used to form said addition product.

12. A composition of matter comprising the heat reaction product of a methylol-melamine containing 1–6 methylol groups and 1–4 molecular proportions of a primary mono-amino-diphenyl free from aldehyde-reactive substituents for each molecular proportion of combined melamine.

13. A composition of matter as defined in claim 11 in which the amino-diphenyl is a primary mono-ortho-amino-diphenyl and the melamine-aldehyde addition product is a methylol melamine.

14. A composition of matter as defined in claim 7 in which the aminotriazine-aldehyde addition product is a water-soluble aminotriazine-aliphatic aldehyde condensation product.

15. A composition of matter as defined in claim 7 in which the aminotriazine-aldehyde addition product is a water-soluble aminotriazine-formaldehyde condensation product.

16. A composition of matter as defined in claim 11 in which the melamine-aldehyde addition product is a water-soluble melamine-aliphatic aldehyde condensation product.

17. A composition of matter comprising the heat reaction product of 1-3 molecular proportions of a primary mono-amino-diphenyl free from aldehyde-reactive substituents, and a water-soluble condensation product of 2-4 molecular proportions of formaldehyde with one molecular proportion of melamine.

18. A composition of matter as defined in claim 17 in which the amino-diphenyl is a primary mono-ortho-amino-diphenyl.

19. A composition of matter as defined in claim 11 in which the melamine-formaldehyde addition product is a water-soluble melamine-formaldehyde condensation product and the amino-diphenyl is mono-ortho-amino-diphenyl.

20. A substantially water-free composition of matter comprising the heat-reaction product of a methylol melamine and a primary mono-ortho-amino-diphenyl free from aldehyde-reactive substituents, the molecular proportions of the amino-diphenyl being at least equal to the molecular proportions of the melamine but not exceeding the molecular proportions of aldehyde used to form said methylol melamine.

21. A resinous composition comprising the composition of matter defined by claim 7, having incorporated therein a material from the group consisting of an aldehyde, hexamethylenetetramine, a phenol-aldehyde partial condensation product, an aminotriazine-aldehyde partial condensation product, a urea-aldehyde partial condensation product and a dicyandiamide-aldehyde partial condensation product.

22. A resinous composition comprising the composition of matter defined in claim 7 having incorporated therein a melamine-formaldehyde partial condensation product.

23. A resinous composition comprising the composition of matter defined by claim 10, having incorporated therein a melamine-formaldehyde partial condensation product.

24. A resinous composition comprising the composition of matter defined in claim 11, having incorporated therein a melamine-formaldehyde partial condensation product.

25. A resinous composition comprising the composition of matter defined by claim 12, having incorporated therein a melamine-formaldehyde partial condensation product.

26. A thermosetting molding composition comprising a filler, a heat-curable melamine-formaldehyde partial condensation product and a heat-reaction product of mono-ortho-amino-diphenyl and a methylol melamine, the molecular proportions of the amino-diphenyl being at least equal to the molecular proportions of the melamine but not exceeding the molecular proportions of formaldehyde used to form said methylol melamine.

27. A composition of matter as defined in claim 7, in which the amino-diphenyl is a chlorinated primary mono-amino-diphenyl.

MILTON J. SCOTT.